United States Patent Office 2,801,212
Patented July 30, 1957

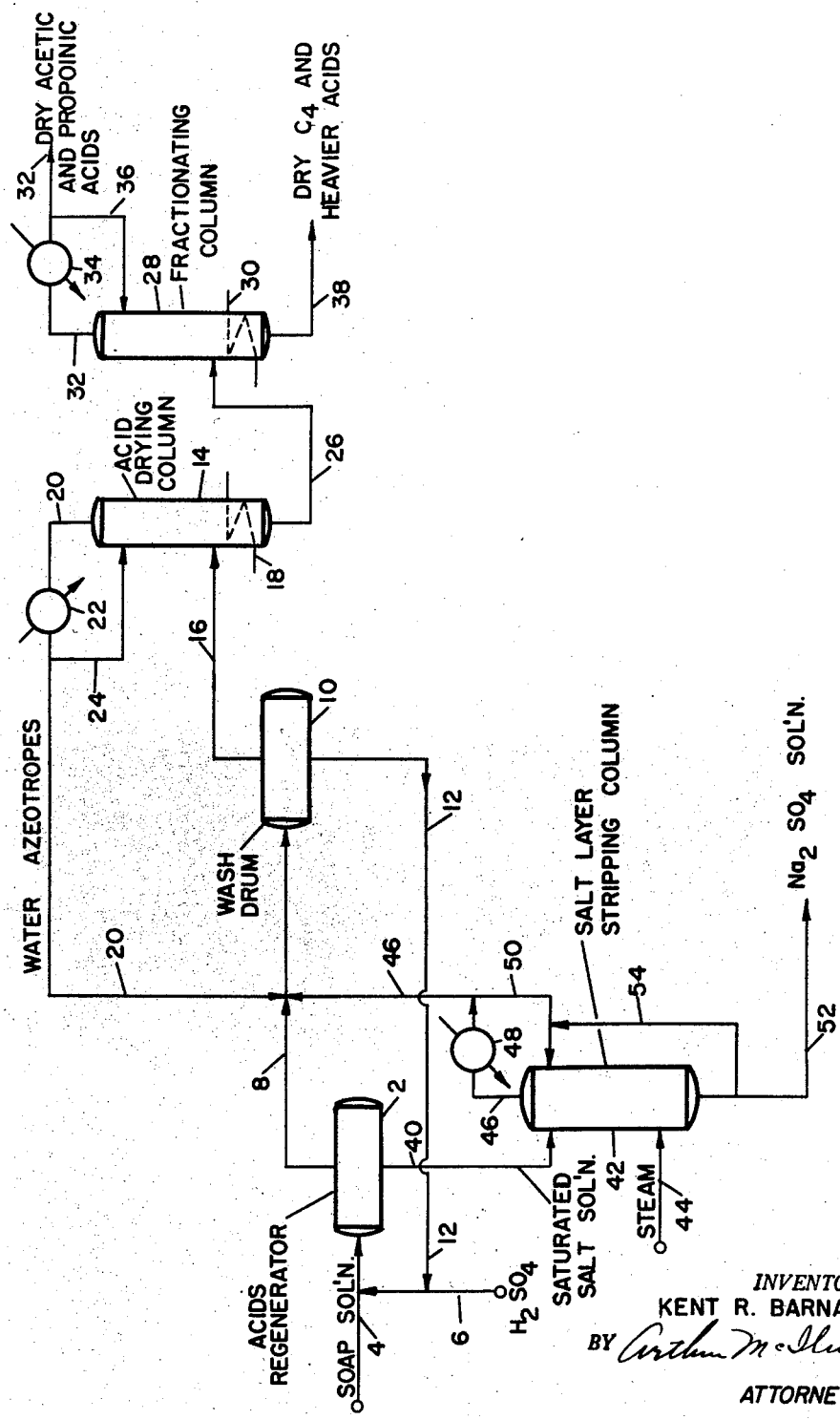

2,801,212

METHOD FOR PROCESSING PREFERENTIALLY OIL SOLUBLE ACIDS

Kent R. Barnard, Tulsa, Okla., assignor to Pan American Petroleum Corporation, a corporation of Delaware Application November 9, 1950, Serial No. 194,821

6 Claims. (Cl. 202—60)

The present invention relates to the purification of organic acids. More particularly, it pertains to the removal of low molecular weight organic acids from preferentially oil soluble acids.

The problem of removing impurities of various types from preferentially oil soluble acids such as, for example, aliphatic acids having four or more carbon atoms, occurs in numerous industrial operations. One of the principal instances, however, in which a satisfactory and practical solution to this problem is most urgently needed is in the purification of these oil soluble acids produced together with other oxygenated organic chemicals in the synthesis of hydrocarbons by the reduction of carbon monoxide with hydrogen in the presence of a fluidized, alkali-promoted iron catalyst. Generally speaking, a hydrocarbon synthesis plant designed to produce around 6,000 barrels per day of motor fuel grade hydrocarbons also produces approximately 250,000 pounds daily of oil soluble chemicals, about one-third of which are acids. Prior to the recovery of these preferentially oil soluble acids from the hydrocarbon solution in which they are present, said solution is separated from the product water layer also produced during synthesis and which contains from about 10 to 12 weight percent of water soluble chemicals including aldehydes, ketones, alcohols, esters and acids. Although the chemicals in the water layer are preferentially water soluble, a small percentage of these compounds is found to be soluble in the oil phase. After the latter has been separated from the product water layer, the acids present therein are removed from the hydrocarbon solution by first adding a sufficient quantity of a suitable base such as, for example, sodium hydroxide, to neutralize completely all of the acids. This neutralization step results in the formation of two layers, the upper layer consisting essentially of hydrocarbons together with non-acid, oxygenated organic compounds and a lower aqueous layer consisting essentially of salts or soaps of the acids originally present in the oil phase. Also, in this lower aqueous layer is contained a small percentage, i. e., 10 to 15 weight percent, of solubilized oil soluble chemicals. The lower, aqueous layer of fatty acid soaps thus obtained is then subjected to a steam stripping operation to remove therefrom the major portion of the impurities. The purified soap concentrate obtained in this manner is next mixed with sulfuric acid or other suitable mineral acid to regenerate a mixture of crude aliphatic acids containing approximately 5 weight percent of solubilized water. It was known that this layer of mixed crude acids contained as impurities a small amount of water soluble acids, i. e., acetic and propionic acids, and it has been proposed to separate these impurities from the preferentially oil soluble acids ($C_4$ and higher acids) by distillation of the crude mixture, thereby removing the water and the low molecular weight water soluble acids and recycling the latter to the portion of the plant handling the chemicals produced in the original or primary product water. However, when distillation of the aforesaid crude acid mixture was carried out, it was found that a distillate was obtained which contained several azeotropes boiling within the narrow range of from about 99° C. to about 100° C. Specifically, this distillate consisted of 32 weight percent acetic acid, 13.4 weight percent n-butyric acid, 6.3 weight percent pentanoic acids (normal and branched chain), and 58.8 weight percent water. Separation of the acetic and propionic acids from such mixtures by means of conventional distillation techniques was impossible. Somewhat similar mixtures of acids were found to occur in the lower aqueous layer produced as a result of the acid regeneration step, and previous methods proposed for the recovery of the low molecular weight acids involved distillation of the resulting salt layer by steam stripping the latter. However, in practice it was found that the acids so recovered consisted of a mixture of acetic and propionic acids together with a substantial proportion of preferentially oil soluble acids.

In a plant where separate equipment is provided for processing water soluble and oil soluble chemicals, the presence of $C_4$ and higher acids in a recycle acid stream to the water soluble chemicals plant is undesirable for several reasons. Thus, to force a mixture of acetic and propionic acids back into the water soluble chemicals plant without entrainment of the $C_4$ and heavier acids, said mixture of acids was introduced into an ethyl acetate extraction unit (or its equivalent) employed to remove water soluble acids from crude aqueous mixtures thereof. The resulting extract was then subjected to distillation whereby the solvent (ethyl acetate) and water are removed overhead, after which the low molecular weight acids, such as acetic and propionic acids, were distilled over in a dry condition. The bottoms from this distillation operation, consisting of $C_4$ and heavier acids together with impurities, was withdrawn and transferred to a neutralization drum where these acids were thereafter combined with the bulk of the preferentially oil soluble acids produced by neutralizing the raw synthesis oil. The combined volumes of soaps of preferentially oil soluble acids were then sent to an acid regenerator where they were converted into their corresponding acids by treatment with a suitable mineral acid. Processing of the resulting mixture was identical with the procedure previously described.

By recycling the distillates from both the drying column and the salt layer stripping column back to the ethyl acetate extractor, an added load was placed on this equipment requiring more solvent and a larger unit. Moreover, although the acetic and propionic acids from the aforesaid distillates were finally combined with the bulk of the acetic and propionic acids present in the primary water stream, the $C_4$ and heavier acids were sent back to the neutralizer where they were neutralized and regenerated with mineral acid for a second time. In a hydrocarbon synthesis plant having a capacity of about 6,000 barrels of hydrocarbons per day, from 3,000 to 6,000 pounds per day of $C_4$ and heavier acids must be neutralized and regenerated twice if existing methods are employed for treating the distillates obtained from the aforesaid drying and salt layer stripping columns.

Accordingly, it is an object of my invention to eliminate the uneconomical features of prior procedures utilized for the treatment of such acid streams by providing a system whereby the acetic and propionic acids, as well as the $C_4$ and heavier acids present in the above mentioned distillates, can be separated into two individual, substantially anhydrous fractions, i. e., a fraction of substantially anhydrous acetic and propionic acids and a fraction of dry $C_4$ and heavier acids. It is a further intention of my invention to provide a method accomplishing the foregoing object whereby a substantial savings in caustic and mineral acid employed in the neutralization and regeneration steps respectively is effected. It is a still further object of my invention to provide a process for effectively separating complex aqueous mixtures of organic acids by drying said mixture and thereafter obtaining the individual acids in a pure state by fractional distillation of the dry mixture.

I have now discovered that the foregoing disadvantages of the prior art procedures mentioned above can be overcome by recycling to the acid regeneration unit the distillates from both the drying column and the salt layer stripping column. In effect, this constitutes recontacting the distillates with a mixture of crude acids in the presence of a water layer essentially saturated with an inorganic salt. Because of the infinite solubility of the acids in the acid layer, as opposed to their limited solubility in the salt layer, which normally contains about 1 weight percent of organic acids, the majority of the acids contained in the combined distillates is to be found in the upper acid layer. Conversely, the solubility of water in the acid layer is limited to the extent of about 5 weight percent, depending on the composition thereof, so that the large majority of the water contained in the combined distillates is to be found in the salt layer. Consequently, the ultimate effect of the system proposed by my invention is that all of the water present in the said mixture of neutralized acids leaves the system in the inorganic salt layer, while all of the acids are withdrawn in the form of a dry mixture from the bottom of the acid drying column. This mixture of dry acids can then be fractionated whereby the acetic and propionic acids are obtained in the form of an overhead fraction free from $C_4$ and heavier acids. Alternatively, the acetic and propionic acids may, if desired, be withdrawn as a liquid sidestream above the feed in the acid drying column. In this manner, installation of the second acid fractionating column can be avoided at a limited sacrifice in separation efficiency, i. e., the acetic and propionic acids stream thus obtained contains a small percentage of water together with a small quantity of $C_4$ and heavier acids.

The combined acid distillates may be recycled to the acid wash drum instead of to the acid regenerator. Inasmuch as the water washings from the former vessel are returned to the acid regenerator to avoid the necessity of separately processing the wash water layer, the same considerations as to acid and water distribution coefficients apply. A further advantage is gained by this procedure, however, since the water contained in the combined acid distillates serves to wash residual mineral acid and inorganic salt from the organic acid layer thus replacing the external source of wash water employed in prior procedures. Since no additional water need be introduced into the system in accordance with the procedure of my invention, the concentration of the mineral acid salt layer in the regeneration drum can be maintained near the saturation level thereby minimizing the quantity of acids solubilized in it and, consequently, reducing the required size of the salt layer stripping column. Under these circumstances, the rectifying sections of the salt layer stripping column and of the acid drying column are not required to concentrate the acid distillates to the azeotropic composition but only to the extent necessary to furnish the desired amount of wash water to the acid wash drum.

The process of my invention is further illustrated in the accompanying flow diagram wherein a mixture of sodium soaps derived from acetic, propionic and $C_4$ and heavier aliphatic acids is introduced into acid generator 2 through line 4. Sufficient sulfuric acid is added to the regenerator via make-up line 6 and line 4 to convert these soaps to their corresponding acids. After the regeneration of the acids is completed, the upper layer which consists essentially of mixed crude acids is withdrawn from the regenerator through line 8 and introduced into wash drum 10 where dilute sulfuric acid together with some sodium sulfate are removed therefrom through line 12 and recycled to acid regenerator 2 via line 6 and 4. The washed mixture of crude acids is taken from wash drum 10 and passed into acid drying column 14 via line 16. Column 14 is provided with suitable heating means such as, for example, a closed coil 18. Within column 14 a vapor fraction consisting essentially of acetic acid and the water azeotropes of propionic and the various preferentially oil soluble acids is separated from a dry liquid fraction of acetic and propionic acids and the $C_4$ and heavier acids. While the preferentially oil soluble acids distilling over with acetic and propionic acids are predominantly $C_4$ and $C_5$ acids, other heavier acids are also collected in the distillate; however, owing to the fact that they are present in smaller percentages than the $C_4$ and $C_5$ acids, the proportion thereof distilled over is smaller. The overhead from column 14 is taken through line 20 provided with condenser 22 and sent to acid wash drum 10 via line 8 and a common mixing point 9. A part of this overhead which consists of approximately 80 weight percent water is returned to the top of column 14 through line 24 as reflux. The liquid fraction is taken from column 14 by means of line 26 and introduced into fractionating column 28, provided with heating coil 30, where dry, substantially pure acetic and propionic acids are withdrawn through line 32, equipped with condenser 34, and sent to storage or to another column (not shown) where separation of the two acids, each in a pure state, is effected. A portion of liquid passing through line 32 is returned to column 28 via line 36 as reflux. The bottoms fraction which consists of a dry mixture of $C_4$ and heavier acids is withdrawn from column 28 through line 38 and sent to another fractionating column (not shown) where these acids are readily separated from one another, each in substantially pure form.

The aqueous layer in acid regenerator 2, which is essentially a saturated solution of sodium sulfate, is withdrawn through line 40 and introduced into stripping column 42 where heat for the stripping operation is supplied by open steam fed into column 42 through line 44. The vapor fraction thus obtained, which consists of acetic and propionic acids and some heavier acids together with water, is taken overhead from column 42 through line 46 provided with condenser 48 and introduced into wash drum 10 via line 8 and a common mixing point 9. Part of the condensate passing through line 46 is returned to the top of the column through line 50 as reflux. A concentrated solution of sodium sulfate substantially free from organic acids is withdrawn from column 42 through line 52 and a portion thereof recycled through line 54 to the top of the column via line 50 in order to further ensure a satisfactory separation of acids from the salt solution.

Although the foregoing description has emphasized the applicability of the present invention to the recovery of acetic and propionic acids from mixtures of preferentially oil soluble acids produced in the synthesis of hydrocarbons by the reduction of carbon monoxide with hydrogen as herein generally set forth, it is to be clearly understood that such invention is equally applicable to the separation of low molecular weight aliphatic acids from other mixtures of the heavier aliphatic acids regardless of their derivation. Thus, for example, the invention may be employed in separating low molecular weight aliphatic acids from aqueous mixtures of the heavier acids which have been produced by the controlled oxidation of various hydrocarbon mixtures.

What I claim is:

1. In a continuous process for the recovery and purification of preferentially oil-soluble aliphatic acids from aqueous mixtures comprising a minor portion of the salts of preferentially water-soluble acids and a major portion of the salts of said preferentially oil-soluble acids wherein said salts are first subjected to an acid regeneration step in a regeneration zone, the improvement which comprises withdrawing the freshly regenerated acids from said zone, mixing said freshly regenerated acids with an aqueous mixture of acids produced as distillate in a step hereinafter specified, allowing the resulting mixture to stratify into an upper acid layer containing solubilized water and a lower water layer substantially saturated with respect to the acids dissolved therein whereby a minimum of said acids in said upper layer is lost to said water layer, withdrawing said upper acid layer and subjecting the latter to distillation at a temperature up to about 100° C. to produce the aforesaid aqueous distillate of acids, and withdrawing a dry bottoms stream comprising a mixture of preferentially oil-soluble acids.

2. The process of claim 1 wherein said lower water layer substantially saturated with aliphatic acids dissolved therein is returned to said regeneration zone whereby the concentration of aliphatic acids in the lower aqueous layer of said zone is maintained at a substantially constant level.

3. In a continuous process for the recovery and purification of preferentially oil-soluble aliphatic acids from aqueous mixtures comprising a minor portion of the salts of preferentially water-soluble acids and a major portion of said preferentially oil-soluble acids, wherein said salts are first subjected to an acid regeneration step in a regeneration zone to produce an upper acid layer containing dissolved water and lower aqueous layer containing aliphatic acids and dissolved inorganic salts produced in the aforesaid regeneration step, the improvement which comprises withdrawing the freshly regenerated acids from said zone, mixing said freshly regenerated acids with an aqueous fraction and an aqueous distillate both being formed in steps hereinafter specified, allowing the resulting mixture to stratify into an upper acid layer containing solubilized water and a lower water layer substantially saturated with respect to the acids dissolved therein, whereby a minimum of said acids in said upper layer are lost to said water layer, withdrawing the aforesaid lower aqueous layer containing aliphatic acids and dissolved salts and subjecting said aqueous layer to a stripping operation whereby the aliphatic acids therein are separated as the aforesaid aqueous fraction from the salts in said lower water layer, withdrawing said upper acid layer and subjecting the latter to distillation at a temperature of up to about 100° C. to produce the aforesaid aqueous distillate of acids, and withdrawing a dry bottoms stream as a result of said last-mentioned distillation step comprising a mixture of preferentially oil-soluble acids.

4. The process of claim 3 wherein said lower water layer substantially saturated with aliphatic acids dissolved therein is returned to said regeneration zone whereby the concentration of aliphatic acids in the lower aqueous layer of said zone is maintained at a substantially constant level.

5. In a continuous process for the recovery and purification of preferentially oil-soluble aliphatic acids from aqueous mixtures comprising a minor portion of the salts of preferentially water-soluble acids and a major portion of the salts of said preferentially oil-soluble acids wherein said salts are first subjected to an acid regeneration step in a regeneration zone to produce an upper acid layer containing dissolved water and a lower aqueous layer containing aliphatic acid and dissolved inorganic salts produced in the aforesaid regeneration step, the improvement which comprises withdrawing the aforesaid lower aqueous layer containing aliphatic acids and dissolved salts and subjecting said lower aqueous layer to a stripping operation whereby the aliphatic acids present in said lower aqueous layer are separated as an aqueous fraction from the salts in said lower aqueous layer, mixing said aqueous fraction with said acid layer, allowing the resulting mixture to stratify into an upper acid layer (1) containing dissolved water and a lower aqueous layer (1) saturated with respect to the aliphatic acids dissolved therein whereby a minimum of said acids in said acid layer (1) is lost to said lower aqueous layer (1) saturated with respect to said acids, withdrawing said aqueous layer (1) and subjecting the latter to distillation at a temperature up to about 100° C., and withdrawing a dry bottoms stream as a result of said distillation step comprising a mixture of preferentially oil-soluble acids.

6. The process of claim 5 wherein said lower aqueous layer (1) is returned to said regeneration zone whereby the concentration of aliphatic acids in said lower aqueous layer (1) is maintained at a substantially constant level.

References Cited in the file of this patent

UNITED STATES PATENTS

| Number | Name | Date |
|---|---|---|
| 1,828,356 | Burwell | Oct. 20, 1931 |
| 1,835,700 | Edmonds et al. | Dec. 8, 1931 |
| 2,092,494 | Bass | Sept. 7, 1937 |
| 2,159,984 | Fisher | May 30, 1939 |
| 2,275,862 | Othmer | Mar. 10, 1942 |
| 2,288,769 | Alleman et al. | July 7, 1942 |
| 2,438,300 | Schniepp | Mar. 23, 1948 |
| 2,580,403 | Burton et al. | Jan. 1, 1952 |
| 2,582,214 | Twigg | Jan. 8, 1952 |
| 2,590,087 | Burton et al. | Mar. 25, 1952 |